Figure 1:
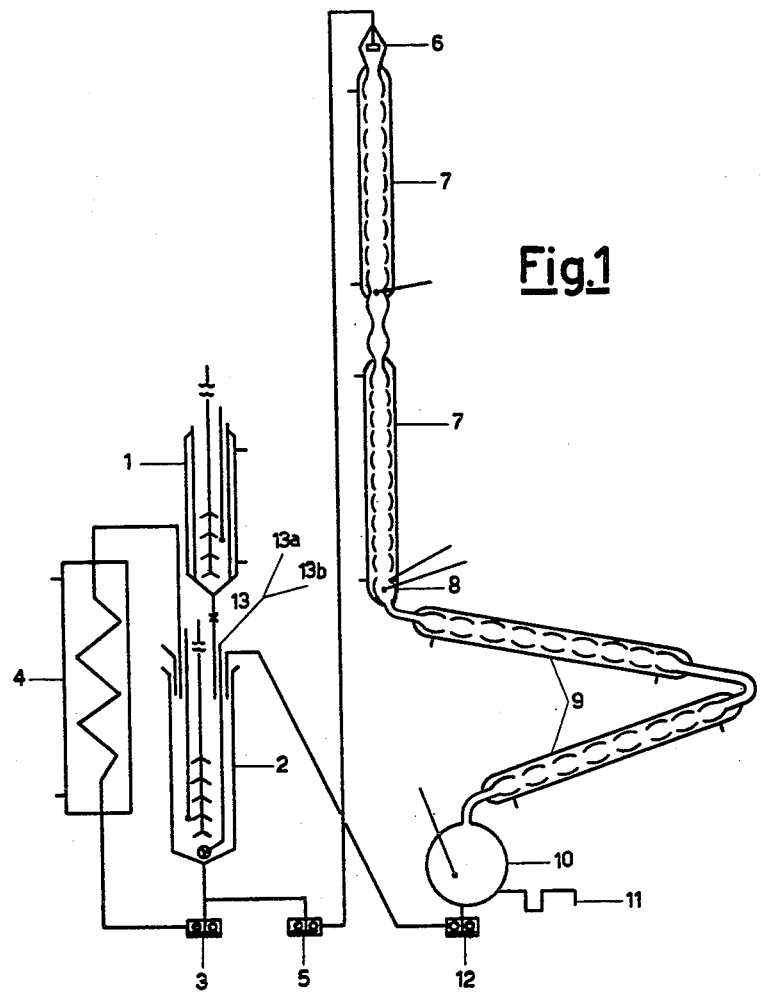

United States Patent Office 3,111,515
Patented Nov. 19, 1963

3,111,515
PROCESS FOR THE NITROSATION OF CYCLOHEXYL COMPOUNDS
Werner Muench, Cesano Maderno, Italy, Giuliana Silvestri, Milan, Italy, and Luigi Notarbartolo, deceased, late of Milan, Italy, by Enza Pascalino Notarbartolo, executrix, Milan, Italy, assignors to Snia Viscosa Societa Nazionale Industria Applicazioni Viscosa S.p.A., Milan, Italy, an Italian company
Filed Aug. 24, 1961, Ser. No. 133,745
Claims priority, application Italy Aug. 26, 1960
7 Claims. (Cl. 260—239.3)

In our earlier U.S. Patent No. 3,022,291, granted February 20, 1962, there has been described the preparation of caprolactam by treatment of cyclohexylic compounds having a tertiary carbon atom with nitrosating means capable of forming NO ions in the reaction medium, in acid medium, in particular in the presence of at least 85% by weight of $H_2SO_4$ or preferably oleum. Examples of such compounds are hexahydrobenzoic acid and its derivatives, such as salts, esters, the chloride, nitrile, anhydride, amide and the ketones of formula

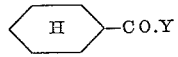

wherein Y is an aliphatic, aromatic, alicyclic or mixed radical. The molar ratio between starting compound and nitrosating agent is preferably between 10:1 and 2:5; and preferably 2.5 or more mols of sulfuric acid per mole of caprolactam calculated.

Although the direct obtention of caprolactam takes place with high yields, it has now been found that in some cases, and in particular when one operates with long times of dwelling of the reaction mass, or with re-employment of the substance which has already reacted, the process can be further improved, thereby obtaining also a purer lactam, if operation is carried out in the presence of oxidizing means.

As an oxidizing means of the kind one may mention firstly oxygen or gases containing oxygen (such as air), nitric acid or other organic oxidants. It is particularly advantageous of course to operate in the presence of nitric acid because this acid reacting with $SO_2$ yields nitrosyl sulfuric acid, thereby producing a nitrosating means and thus takes part in the reaction, increasing the yields. In general, minimum, or at least moderate, quantities of the oxidizing means are added, because the reaction takes place also with high yields even if they are not added at all.

However, if the oxidizing means is nitric acid, it is possible to use even considerable quantities thereof, because as said it causes the formation of the nitrosating means. The excess quantity of nitric acid, which does not cause any formation of nitrosating means, should not exceed preferably 10% (mole percent) of said means. By adding reducing means, in particular $SO_2$, it is possible thus to increase the quantity of nitric acid added; but it ought to be borne in mind that in the formation of caprolactam there are formed, in the above mentioned cases, by reason of undesirable secondary reactions, reducing substances, in particular $SO_2$, whence it is convenient to take into account the presence of $SO_2$ formed in situ which too reacts with the nitric acid to form nitrosyl sulfuric acid. It is even believed that the improvement found with the addition of oxidants in said cases, can be explained by the existence of said reducing substances. Which oxidizing means should be preferred depends on the manner of carrying out the process; for instance, it is at least difficult to employ—in order to keep temperature constant when operating in the presence of an organic solvent—air or oxygen as an oxidizing agent. On the other hand, air proves particularly useful in some cases, specially with continuous processes. Nitrosation takes place preferably at a temperature of between 50° and 100° C. The mixture of the reactants can be effected at low temperature.

The addition of nitric acid is also particularly favourable if operation is carried out in discontinuous (batch) process or in the presence of an organic solvent. The process will be better illustrated by the examples hereinafter described.

Example 1

The apparatus illustrated in FIG. 1 is used. In a mixer 1 are mixed in the cold (20° C.) 1060 g. of hexahydrobenzoic acid and 854 g. of oleum with 27% of $SO_3$. Into the mixture passed to a second mixer 2 and cooled therein there are introduced, at 15° C., 28 g. of $N_2O_3$ (tube 13a). The heat of formation of the nitrosyl sulfate is eliminated by circulating the mass through a coil cooled down to —18° (4). Then reaction is allowed to take place in the vertical glass reactor 7 having corrugated surface and 120 cm. long, externally heated with oil at 100° C. transported there by means of a pump 5. The reaction mixture cooled down in the coolers 9 kept at 9–18° C., is recycled by means of a pump 12 to the mixer 2; again 28 g. of $N_2O_3$ are introduced (tube 13a) and contemporaneously 200 litres of dried air (tube 13b) and the reaction is repeated.

To the mass recycled and cooled down again, more 56 g. of 60% oleum ($t=15°$ C.) are added as well as 28 g. of $N_2O_3$ and 200 litres of air are made to pass; and, after the reaction, to the recycled and cooled mass a further 30 g. of oleum having 60% of $SO_3$ content are added as well as 28 g. of $N_2O_3$ ($t=15°$ C.) and 200 litres of air; and reaction is allowed to take place.

To that base material, which in regard of its quantity and of its composition, is from now on always recycled unaltered in the apparatus, there are added (in the mixer 2) in 1 hour, 256 g. of hexahydrobenzoic acid and 343 g. of oleum (having 35% oleum content) and contemporaneously there are introduced 38 g. of $N_2O_3$ (tube 13a) and 200 litres of dried air (tube 13b) until the concentration of the mass with $N_2O_3$ attains 1.45%.

The heat of formation of nitrosyl sulfate in the absorber is eliminated by means of circulation of the mass to be saturated, through the coil 4 cooled down to —18° C.

At the end of saturation the mass is made to pass by means of a small pump 5 at the speed of about 29 cc./min. through the reactor 7 heated at 100° C., then cooled down to about 25° C. (coolers 9 kept at —18° C.), and the product of reaction is collected in the flask 10 which by means of a siphon discharges 600 g./hr., while the remaining 2000 g. thereof return in the same lapse of time to the absorber 2 by means of the small pump 12.

The whole cycle is then repeated in continuation for an arbitrary number of times.

The 600 g. of the reaction material separated every hour are hydrolized with water and ice, extracted with ether to separate therefrom the unreacted hexahydrobenzoic acid, which is recovered; the aqueous layer neutralized to pH=7 is treated with chloroform to extract the lactam therefrom.

Thereby 88 g./hour of lactam slightly coloured are obtained as an average and 143 g. of hexahydrobenzoic acid are recovered, which represents a yield of lactam of 88.2% of the theoretical yield calculated on the hexahydrobenzoic acid consumed and of 77.9% on the $N_2O_3$ applied.

If instead only $N_2O_3$ is introduced without contemporaneous introduction of air, 70.3 g. of crude lactam/per hour are obtained and 164 g. of hexahydrobenzoic acid are recovered and the yield of crude lactam is 86.6% calculated on the hexahydrobenzoic acid consumed and 62.2% of theoretical as calculated on the $N_2O_3$ introduced.

*Example 2*

Figure 2:
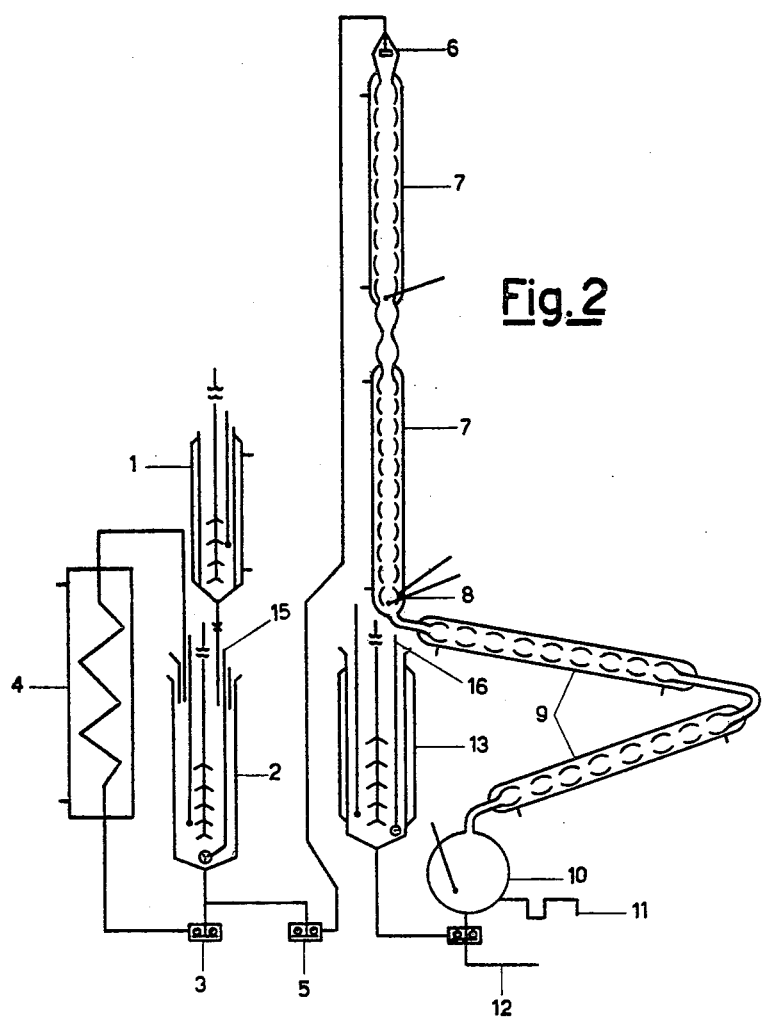

For this example there serves in general the same apparatus of Example 1 to which there is added—see FIG. 2—also a mixer 13 (of the kind of the absorber 2) which serves for the separate treatment with air of the reacted mass, so that the saturation with $N_2O_3$ in the second absorber 2 is effected on a mass already free from $SO_2$. This modification of course requires double of the quantity the "base material" prepared as described in Example 1.

Four kg. of the lactamic solution ("bottom body") are distributed at a ratio of 2 kg. each over the absorbers 2 and 3.

The 2 kg., which are in the absorber 2, are mixed for 1 hour with 256 g. of hexahydrobenzoic acid and 343 g. of 35% oleum and contemporaneously saturated in an absorber 2 with 38 g. of $N_2O_3$ (up to a maximum concentration of 1.45% on the mass). The heat of formation of the nitrosyl sulfate in the absorber is eliminated by means of circulation of the mass to be saturated, through a coil cooled down to $-18°$ C. (4). At the end of the saturation the mass is made to pass by means of a small gear pump 5 at the speed of 29 cc./min. through a vertical reaction tube of glass having corrugated surface 7, 120 cm. long, heated externally with oil to 100° C.

At the end of reaction tube there is provided a tube for venting the $CO_2$ (8), which develops during the reaction.

The product of reaction passes through a cooler cooled down to $-18°$ C. (9) and is collected in a small flask 10 from which by means of a siphon 11 600 g./hr. are discharged.

In the same time (1 hour) the 2 kg. of the "base material" existing in the cylindrical tube 13 are subjected at 20° C. to a stream of air (200 litres/hour). The afflux of reacted mass transported from the flask 10 by means of the pump 12 to the mixer 13 is effected at the same rhythm by means of a siphon 14 and the mass is discharged into the mixer 2 and is mixed therein again with 600 g. more of fresh hexahydrobenzoic and oleum (35% of $SO_3$) mixture prepared in the mixer 1 and about 38 g. of $N_2O_3$ in 1 hour.

In that way the cycle of the mass continues for any desired number of cycles.

The 600 g. of reaction material separated every hour are hydrolized with water and ice, extracted with ether to separate the hexahydrobenzoic acid, which has not reacted and is employed again, the aqueous layer neutralized to pH=7 is treated with chloroform to extract lactam therefrom.

Thereby 95 g. of crude lactam average are obtained, which represents the hourly production of the apparatus and 133.5 g. of hexahydrobenzoic acid are recovered, which corresponds to a yield of crude lactam equal to 88%, calculated on the hexahydrobenzoic acid that has disappeared, and to 84% calculated on the $N_2O_3$ introduced.

*Example 3*

A ½ litre flask is used as a reaction vessel, which is provided with a stirrer, with conduits for the entrance and discharge of gases, with a dropping funnel and thermometer. In the flask there is a solution of 34.2 g. of hexahydrobenzoic acid, in a mixture prepared under cooling, of 14.7 g. of oleum (22% of $SO_3$), 1 g. of concentrated nitric acid and 0.636 g. of nitrosyl sulfuric acid dissolved in 0.754 g. of concentrated sulfuric acid.

Into the mixture cooled down to 20° C. there is introduced a stream of $SO_2$ until saturation. Then the mass is heated while stirring up to 65° C.

At that temperature there begins an exothermic reaction with development of gas ($CO_2$). The source of heat is taken away and the temperature of the mixture is controlled by cooling from outside so that it will not exceed 96° C.

At the end of the reaction the development of gas ceases. Stirring is continued until the mass of reaction has assumed the room temperature, then it is poured onto ice and extracted with ether. From the ether there is extracted—by washing with a 10% sodium carbonate solution—the unreacted hexahydrobenzoic acid, which is precipitated by acidifying the carbonate solution and is purified by dissolving it in cyclohexane, filtering and evaporating the solvent.

From the original aqueous portion of the reaction mass one obtains after neutralization to pH=7, the caprolactum, by extraction with chloroform. Thereby 31.82 g. of purified hexahydrobenzoic acid are obtained to be re-employed as well as 1.84 g. of caprolactam. Taking into account the recovered starting substance, the calculated caprolactam yield is 87.7% of theory as referred to hexahydrobenzoic acid, and 307% of theory as referred to the NO employed, which is explained by the fact that the nitric acid, which indirectly acts as a nitrosating means, has taken part in the reaction.

*Example 4*

Into a flask having the capacity of one litre and provided with a stirrer, with a dropping funnel, with a thermometer and with a tube for the discharge of gas, there are introduced 192 g. of hexahydrobenzoic acid, which are mixed little by little with 56.2 g. of oleum (40% of $SO_3$), stirring and keeping the temperature at about 30° C. by means of cooling from the outside.

The mixture is heated up to 80° C., the source of heat is taken away and there is added dropwise and while steadily stirring about the half of a solution of 63.5 g. of nitrosyl sulfuric acid in 75.4 g. of concentrated sulfuric acid, in such a way that the temperature of the content of the flask adjusted by cooling down should not become higher than 90° C. There begins at once a vivacious development of gas.

As soon as this ceases, there is added dropwise under equal conditions the second half of the mixture sulfuric acid + nitrosyl sulfuric acid already mixed previously with 1 g. of concentrated nitric acid, whereby the gaseous development is taken up again. After about 40 minutes all of the nitrosyl sulfuric acid has been added; and the development of gas is slowed down and ceases quite soon. By stirring the mixture is cooled down to room temperature and is poured onto ice. The mixture is extracted with ether, the ether extract is treated with a 10% sodium carbonate solution, the layer containing the sodium carbonate is separated and is acidified. The unreacted hexahydrobenzoic acid precipitates in oily form. The mass of reaction, aqueous in origin and de-ethered, is neutralized first approximately with 40% sodium hydroxide solution and is then brought to complete neutrality (pH=7) with 10% sodium carbonate solution, is extracted until exhaustion with chloroform; the chloroform extract is dried; and the solvent is evaporated.

There remains a residue of 53.7 g. of caprolactam slightly coloured (melting point 60/65° C.). The precipitated impure hexahydrobenzoic acid can be purified by means of absorption in cyclohexane, in which there remain dissolved small quantities of resins. After having filtered and dried the solution and evaporated the solvent, there are obtained 125.2 g. of crystallized hexahydrobenzoic acid (melting point 30° C.).

Taking into account this recovered amount, the yield of caprolactam corresponds to 91% of theoretical as calculated on the hexahydrobenzoic acid and to 95% of theoretical as calcuated on the NO introduced.

Operating the same way, but without any addition of nitric acid, the yields correspond to 88–92% of theoretical as referred to the hexahydrobenzoic acid and to 88% as referred to the NO employed.

Example 5

In a 1 litre flask provided with a stirrer, with two dropping funnels and with a refluxing cooler provided with a calcium chloride tube, 96 g. of hexahydrobenzoic acid are dissolved in 200 cc. of cyclohexane.

One of the two dropping funnels contains a mixture, prepared under stirring and cooling, of 56.2 g. of oleum (40% of $SO_3$), 75.4 g. of concentrated sulfuric acid, 63.5 g. of nitrosyl sulfuric acid and 1 g. of concentrated nitric acid.

The other dropping funnel contains 96 g. of fused hexahydrobenzoic acid. The solution contained in the flask is heated up to mild ebullition of the cyclohexane (81° C.); the source of heat is taken away and, still while stirring, the liquid contained in the two dropping funnels is made to descend in such a way that the addition of hexahydrobenzoic acid should terminate a little earlier than that of the nitrosating mixture. With the exothermic reaction that is started, the cyclohexane keeps in mild ebullition. The gases that develop during the whole course of the reaction, escape through the refluxing cooler.

When all the substances have been introduced, stirring is continued for a short time until the development of gas ceases.

Cooling is effected, the layer of cyclohexane is separated and the reaction mixture is poured onto ice.

Elaboration is identical to that of the preceding example.

There are obtained 51.8 g. of caprolactam only slightly coloured (melting point 59–64° C.); and 128.7 g. of unreacted hexahydrobenzoic acid are recovered.

Taking into account this quantity of hexahydrobenzoic acid recovered and to be employed again, the yield of caprolactam is calculated to be 92.8% of theoretical as referred to hexahydrobenzoic acid and 91.7% of the theoretical as referred to the NO employed.

Example 6

18.2 g. of dimethylic ester of hexahydrobenzoic acid (B. point $^{13.5}$:68° C.) are introduced into a 100 cc. spherical globe provided with stirrer, thermometer, dropping funnel, and gas intake and outlet tubes. Stirring all the time, and to the ester drop by drop, cooling from the outside, a mixture which is to be found in the dropping funnel and is composed of 14.7 g. of 22% oleum, 1 g. of nitric acid and 1.45 g. of a solution of 0.63 g. of nitrosyl-sulphuric acid in 0.82 g. of concentrated sulphuric acid, in such a manner that the temperature of the mixture does not exceed 20° C. Remove the cooling bath and, while continuing to stir, introduce $SO_2$ into the mass until saturation, then heat prudently up to 65° C. An exothermic reaction will start very soon and $CO_2$ will be produced, thus bringing the temperature of the mass up to 98° C.

The reaction ends after 3 minutes as may be ascertained by observing the drop in temperature. Cool to room temperature and pour on to ice.

To elaborate the reaction mixture, extract the unreacted dimethyl ester therefrom by beating the mixture with cyclohexane; after separation and evaporation of the cyclohexane, 16.43 g. of the ester are recovered.

First neutralize the waters roughly with 25% caustic soda, and then accurately with 10% sodium carbonate (pH 7), and extract with chloroform the caprolactam formed. After evaporation of the chloroform, 1.3 g. of clear-coloured caprolactam remain. Taking into account the 16.43 g. of ester recovered, the yield of lactam is 92.2% in relation to the reacted ester, and 234% in relation to the quantity of NO initially introduced in the form of nitrosyl-sulphuric acid; this is explained by the fact that the nitric acid acted as a nitrosating agent and took part in the reaction.

Example 7

In the 250 cc. globe of the same apparatus described in Example 6, there are 30.2 g. of eptylic ester of hexahydrobenzoic acid (boiling point $^{0.4}$ 108–111° C.), and in the dropping funnel there is a mixture of 14.7 g. of 22% oleum, 1 g. of concentrated nitric acid and 1.45 g. of a solution of 0.63 g. of nitrosyl sulphuric acid in 0.82 g. of concentrated sulphuric acid. Drip the mixture on to the ester while stirring and cooling, without allowing the temperature to rise above 20° C., saturate the mixture, still at this temperature, with $SO_2$, cease cooling and heat prudently up to 65° C.; this starts an exothermic reaction with the production of gas, which ends after 8 minutes. During this time the temperature rises to 102° C.

Continue stirring until the mixture has reached room temperature, pour on to ice and proceed as described in Example 6.

0.5 g. of crude lactam are obtained which, when calculated in relation to the quantity of NO introduced in the form of nitrosyl sulphuric acid, correspond to 89.9% of the theoretical yield. By nitrosating 28.9 g. of eptylic ester of the hexahydrobenzoic acid with a mixture of 15.5 g. of 60% oleum and a solution of 13.56 g. of nitrosyl sulphuric acid in 12.64 g. of concentrated sulphuric acid at a maximum temperature of 85° C.—i.e. without adding nitric acid, 6.9 g. of lactam are obtained, corresponding to a yield of only 53.5% of the theoretical yield referred to the quantity of NO introduced.

Example 8

There are 26.9 g. of cyclohexyl-p-tolylketone in a 100 cc. globe provided with stirrer, dropping funnel, thermometer and gas outlet tube, and there are 44.1 g. of 22% oleum in the dropping funnel, which are added by drops to the ketone, stirring and cooling the latter to 20–25° C. Keeping the temperature the same, saturate the mixture with $SO_2$ and then, stirring and cooling all the time, add by drops a solution of 0.63 g. of nitrosyl-sulphuric acid in 0.82 g. of concentrated sulphuric acid, without letting the temperature rise above 25° C.

Finally drip in a further gram of concentrated nitric acid, observing after each drop a lively exothermic reaction, and, while continually cooling from the outside with ice-cold water, a rise in the temperature of the total mass to 31° C. Heat the mixture for another 5 minutes to 45° C., stir it until it has reached room temperature, pour on to ice, and proceed as follows. Treat the hydrolyzed acid with ether, thus extracting the unreacted ketone and the p-toluic acid that has formed. (The two substances are separated in the usual manner by extracting the ether with 10% sodium carbonate.) After partially neutralizing the aqueous layer of the hydrolized acid with alkalis and then completely neutralizing same with 10% sodium carbonate (pH 7), extract same with chloroform and, after the latter has been dried and evaporated, there remains the lactam formed.

The yield of caprolactam (1.5 g.) referred to the NO introduced in the form of nitrosyl-sulphuric acid, is 207.2% of the theoretical yield, and this shows that the nitric acid added took part in the reaction as a nitrosating agent. For the same reason, the yield of p-toluic acid (1.15 g.) is 170.3% of the theoretical yield referred to the NO introduced in the form of nitrosyl-sulphuric acid.

Example 9

Prepare a solution of 26.9 g. of cyclohexyl-p-tolylketone in 44.1 g. of 22% oleum, in the manner described in the previous example. Then, while stirring and cooling, add a solution of 0.63 g. of nitrosyl-sulphuric acid in 0.82 g. of concentrated sulphuric acid and, still keeping the temperature at 25° C., add 1 g. of concentrated nitric acid, heating for a further 5 minutes to 65° C.

After cooling, proceed as described in the previous example. 23.95 g. of ketone and 1.35 g. of lactam, equal to 82% of the theoretical quantity referred to the reacted ketone and 243% thereof referred to the NO introduced in the form of nitrosyl-sulphuric acid, are recovered.

The yield of 1.5 g. of p-toluic acid corresponds to 75.5%.

*Example 10*

To 42.6 g. (0.3 mole) of methylic ester of hexahydrobenzoic acid, add by drops over 3 hours a mixture of 25.4 g. of nitrosyl-sulphuric acid (0.2 mole), 32 g. of concentrated sulphuric acid and 0.5 g. of concentrated nitric acid, stirring the while and cooling effectively from the outside, without letting the temperature rise above 30° C. After all the aforesaid quantity of mixture has been added, add to the mixture, still stirring and cooling to maintain a temperature not above 30° C., 20 g. of 40% oleum. Cease cooling and heat while continuing to stir, bringing the temperature up to 40° C. in the course of 2 hours; at this temperature there starts a regular development of gas. When this development slackens, raise the temperature, bringing it gradually, within the space of a further 3 hours, to 60° C.

When this temperature has been reached, the production of gas will practically have stopped and will not start again even though the temperature is further raised; this indicates that the reaction has reached its end.

Continue to stir until the mass has assumed room temperature, and then proceed as described in Example 6.

13.8 g. of ester are recovered and 21.12 g. of lactam are obtained. If we take into account the quantity of ester recovered, the yield of lactam corresponds to 92% of the theoretical yield referred to the reacted ester, and 93.5% of the theoretical yield referred to the NO introduced in the form of nitrosyl-sulphuric acid.

*Example 11*

In the same manner as described in Example 7, 33.9 g. of eptylic ester of hexahydrobenzoic acid (0.15 mole) mixed with 16 g. of 40% oleum, are nitrosated with a mixture of 12.7 g. (0.1 mole) of nitrosyl-sulphuric acid, 9.8 g. of concentrated sulphuric acid and 0.1 of nitric acid.

In the operation, 7.5 g. of ester and 7.32 g. of lactam are recovered, that is, taking into account the recovery of ester, the yield obtained is 55.4% of the theoretical yield referred to the reacted ester. In relation to the NO introduced in the form of nitrosyl-sulphuric acid, the yield is 64.8% of the theoretical one.

*Example 12*

In a globe provided with stirrer, thermometer and dropping funnel, dissolve 39.4 g. of cyclohexyl-p-tolylketone in 50 cc. (equal to 39.5 g.) of cyclohexane.

While continually stirring and cooling the globe from time to time with running water, add to the solution over 15 minutes a mixture of 19.05 g. of nitrosyl-sulphuric acid, 19.52 g. of concentrated sulphuric acid and 1.5 g. of concentrated nitric acid, without letting the temperature of the mass exceed 30° C.

Stir for a further 3 hours, still cooling if necessary to avoid the temperature rising over 30° C., then decant the cyclohexane and mix the mass with ice-cold water.

The mass treated with ice-cold water is processed in the manner described in Example 8.

14.86 g. of lactam and 21.4 g. of p-toluic acid are obtained, and in addition, 5.3 g. of unreacted ketone are recovered.

Taking into account the quantity of ketone recovered (6.2 g.), the yield of lactam referred to the reacted ketone corresponds to 80% of the theoretical, and the yield of p-toluic acid to 95.7% thereof.

The yield of lactam referred to the NO introduced in the form of nitrosyl-sulphuric acid amounts to 87.6% of the theoretical, and that of the p-toluic acid to 104.9% thereof.

By proceeding in the same manner, but without adding the nitric acid to the nitrosation mixture, 13.25 g. of lactam, i.e. only 78.2% of the theoretical referred to the NO introduced as nitrosyl-sulphuric acid, and 19.8 g. of p-toluic acid, equal to 97% of the theoretical, are obtained.

What is claimed is:

1. A process for the preparation of caprolactam by subjecting the starting material in a sulphuric acid reaction medium, the sulphuric acid employed containing at least sufficient $SO_3$ to provide 75% by weight of $H_2SO_4$, to the action of a nitrosating agent which provides NO ions in such sulphuric acid reaction medium, said starting material being a cyclohexyl compound having a tertiary carbon atom and derived by replacing only one of the hydrogen atoms of cyclohexane by a substituent group connected by the carbon atom of a carbonyl group of said substituent group, comprising adding to the nitrosating agent an oxidizing agent selected from the group consisting of oxygen air, and nitric acid.

2. A process according to claim 1, wherein the oxidizing agent is nitric acid and is employed in an amount less than a molar percentage of 10% of the nitrosating agent.

3. A process according to claim 1, wherein the nitrosating agent is nitrosyl sulfuric acid.

4. A process according to claim 1, wherein the oxidizing agent is nitric acid, and wherein $SO_2$ is added to the reaction mixture.

5. A process according to claim 1, wherein the reaction between the starting material and the nitrosating agent takes place at temperatures between 50° and 100° C.

6. A process according to claim 4, wherein the amount of $SO_2$ added is less than the amount required to transform the nitric acid added to nitrosyl sulfuric acid.

7. A process for the preparation of caprolactam by subjecting a hydrobenzoic acid starting material in a sulfuric acid reaction medium, the sulfuric acid employed containing sufficient $SO_3$ to provide 85% by weight of $H_2SO_4$, to the action of a nitrosating agent which provides NO ions in said sulfuric acid reaction medium, comprising adding to the nitrosating agent an oxidizing agent chosen from the group consisting of oxygen, air, and nitric acid.

References Cited in the file of this patent

UNITED STATES PATENTS

| | | |
|---|---|---|
| 3,022,291 | Muench et al. | Feb. 20, 1962 |

FOREIGN PATENTS

| | | |
|---|---|---|
| 1,238,981 | France | July 11, 1960 |
| 52,901/59 | Australia | Mar. 24, 1960 |
| 52,908/59 | Australia | Mar. 24, 1960 |